Patented July 28, 1931

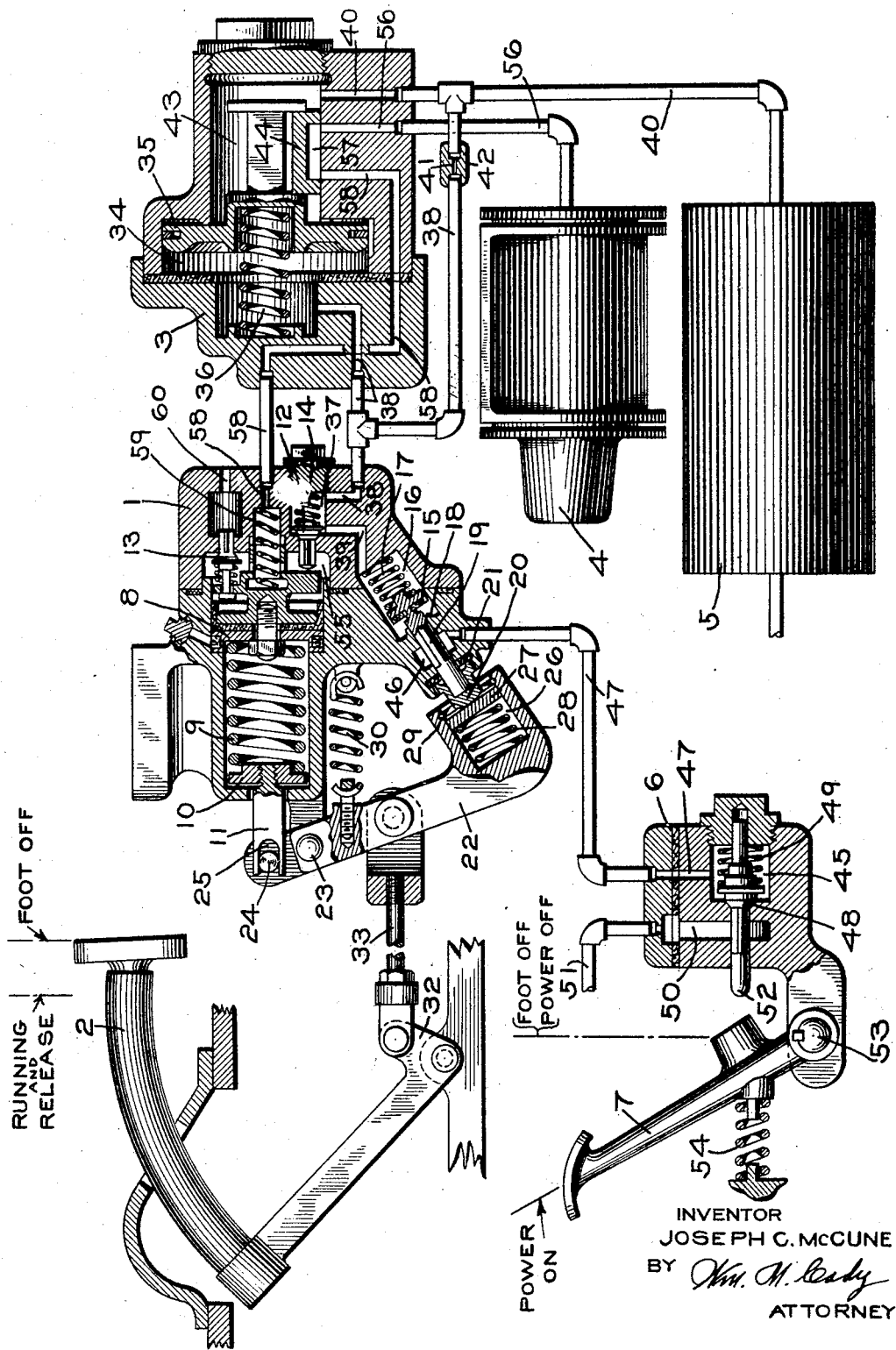

1,816,089

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed May 26, 1930. Serial No. 455,699.

This invention relates to fluid pressure brake equipment and more particularly to that type in which an application of the brakes is automatically effected in the event of the incapacitation of the operator.

The principal object of my invention is to provide a fluid pressure brake equipment of the above type having a foot controlled brake valve mechanism and a car motor controller operating mechanism which are so interlocked that an emergency application of the brakes will be automatically effected in the event of the entire relief of manual pressure from both of said mechanisms, and that an automatic emergency application will be prevented in the event of the entire relief of manual pressure from one of said mechanisms while manual pressure is maintained on the other.

Other objects and advantages will appear in the following more detailed description of the invention.

In the accompanying drawing, the single figure is a diagrammatic view, mainly in section, of a fluid pressure brake equipment embodying my invention.

The fluid pressure brake equipment shown in the drawing may comprise a brake valve device 1, a foot controlled pedal lever 2 for controlling the operation of the brake valve device 1, an emergency valve device 3, a brake cylinder 4, a main reservoir 5, a pilot valve device 6, and a foot pedal lever 7 for controlling the operation of the car motor controller (not shown).

The brake valve device may comprise a casing having a piston chamber 55 containing a piston 8 subject to the pressure of a coil spring 9. One end of this spring is seated on the piston 8 and the other end on a plunger 10, having a stem 11, which extends out through an opening in the casing.

Contained in the casing is a fluid pressure supply valve 12 and an exhaust or release valve 13. The release valve 13 is operatively connected to the piston 8 in such a manner that, in normal release, the valve is held off its seat, and the supply valve 12 is normally held seated by a spring 14, and is adapted to be unseated by the inward movement of the piston 8.

Also contained in the casing of the brake valve device 1 is an emergency valve 15, which is contained in a chamber 16 and is subject to the pressure of a spring 17 tending, at all times, to seat the valve on its seat rib 18. This valve is provided with a stem 19, which extends out through an opening in the casing and at its outer end is provided with a cap 20 which, when the valve is unseated, seats on a gasket 21 mounted in the casing and prevents leakage of fluid under pressure about the valve stem.

For the purpose of controlling the operation of the brake valve device 1, a lever 22 is provided which, intermediate its ends, is pivotally mounted on a pin 23 anchored in the casing of the brake valve device. One end of this lever is provided with a laterally extending pin or projection 24 adapted to engage the stem 11 at the inner end of a slot 25 formed in the stem.

The other end of the lever 22 is provided with a recess 26 in which there is slidably mounted, a member 27 which is adapted to operatively engage the outer end of the cap 20 on the stem of the emergency valve 15, said member being subject to the pressure of a spring 28. Undue outward movement of the member 27 is prevented by a snap ring 29 mounted in the casing. To this end of the lever 22 is attached one end of a torsion spring 30, the other end of the spring being attached to the casing.

The brake controlling pedal lever 2 is pivotally mounted at 31 on any desired fixed part of the car body, and is adapted to be operated by the foot of an operator. This pedal lever is provided with an arm 32 to which one end of a pull rod 33 is operatively connected, the other end of which rod is operatively connected to the lever 22, preferably at a point intermediate the pin 23 and the end of the lever in which the member 27 is mounted.

The emergency valve device 3 comprises a casing having a piston chamber 34 containing a piston 35, which is subject to the pressure of a spring 36. The chamber 34 is constantly connected to a chamber 37 in the brake valve device containing the supply valve 12 through passages and pipe 38, and by way of the chamber 37 and a passage 39 is connected to the emergency valve chamber 16 in the brake valve device. The pipe 38 is constantly connected to the main reservoir 5 through a main reservoir pipe 40 and a restricted passage 41 in a pipe fitting 42.

The casing of the emergency valve device also has a chamber 43, which is constantly connected to the main reservoir 5 through pipe and passage 40 and contains a slide valve 44 adapted to be operated by the piston 35.

The pilot valve device 6 may comprise a casing having a chamber 45, which is connected to a chamber 46 in the brake valve device 1 through a passage and pipe 47, and contains a pilot valve 48 which is subject to the pressure of a spring 49, and which is for the purpose of controlling communication from the chamber 45 to a chamber 50 leading to the usual sand traps (not shown) through a pipe 51. The pilot valve is provided with a stem 52, which extends out through an opening in the casing, and its outer end is adapted to be operatively engaged by the pedal lever 7, which is secured to the operating shaft 53 of the car motor controller (not shown), when the pedal lever is operated to its foot off position. This pedal lever is urged toward its foot off position by the pressure of a spring 54.

In operation, the usual fluid compressor (not shown) compresses fluid into the main reservoir 5. From the main reservoir, fluid under pressure is supplied to the valve chamber 43 of the emergency valve device through main reservoir pipe 40 and from the pipe 40 fluid under pressure is supplied to the piston chamber 34 of the emergency valve device and supply valve chamber 37 of the brake valve device through the choke fitting 41 and pipe and passage 38. From the chamber 37 fluid under pressure is supplied to the emergency valve chamber 16 of the brake valve device through passage 39.

With the equipment thus charged with fluid under pressure, the emergency piston 35 and slide valve 44 will be maintained in their extreme right hand position, as shown by the pressure of the spring 36. With the slide valve 44 in this position, the brake cylinder 4 is connected to the piston chamber 55 of the brake valve device through a pipe and passage 56, a cavity 57 in the emergency slide valve, and a straight air passage and pipe 58.

When the brake controlling pedal lever 2 is in foot off position, the power of the spring 30 maintains the lever 22 in the position shown in the drawing, in which position, the projection 24 of the lever will be out of engagement with the stem 11 of the plunger 10 of the brake valve device, and in which, the other end of the lever, through the medium of the spring 28 and plate 27 maintains emergency valve 15 unseated, so that communication is established from the chamber 16 to the pilot valve chamber 45, past the unseated valve 15 and its fluted stem, through chamber 46 and pipe and passage 47. Since the projection 24 of the lever 22 is out of engagement with the stem 11 at the end of the slot 25, the spring 9 will not be compressed, and therefore will not exert any pressure on the piston 8, so that the pressure of a spring 59 will maintain the piston in brake releasing position in which the release valve 13 is unseated and in which the pressure of the spring 14 seats the supply valve 12.

With the release valve 13 unseated, the brake cylinder 4 is connected to the atmosphere through pipe and passage 56, cavity 57 in the emergency slide valve 44, straight air passage and pipe 58, piston chamber 55 of the brake valve device, past the unseated valve 13 and its fluted stem and a passage 60.

Assuming the motor controller pedal lever 7 to be in a power on position, as shown in the drawing, the pilot valve 48 of the pilot valve device 6 is maintained seated by the pressure of the spring 49, thus preventing the flow of fluid under pressure from the chamber 45, and consequently the emergency piston chamber 34 to the atmosphere through the chamber 50 and sanding pipe 51, so that the brakes will be maintained released.

If, however, the operator should remove his foot from the pedal lever 7 when the brake controlling pedal lever 2 and brake valve device are in foot off positions, as just described, and as shown in the drawing, the pressure of the spring 54 will cause the pedal lever 7 to move to its foot off position in which the valve 48 is unseated against the pressure of the spring 49. With the valve 48 unseated, fluid under pressure is vented from the emergency piston chamber 34 to the atmosphere by way of passage and pipe 38, supply valve chamber 37 of the brake valve device 1, passage 39, emergency valve chamber 16, past the unseated emergency valve 15 and the fluted portion of its stem 19, to chamber 46, and from thence through pipe and passage 47, pilot valve chamber 45, past the unseated pilot valve 48 and through chamber 50 and sand pipe 51. Fluid under pressure thus discharged through the pipe 51 causing sand to be deposited on the track rails.

With the emergency piston chamber 34 thus vented, fluid under pressure in the slide valve chamber 43 causes the emergency piston 35 to shift to its extreme left hand position against the pressure of the spring 36, carrying the slide valve 44 with it. With the slide valve in emergency position, the passage 56 is uncovered, so that fluid under pressure from the emergency slide valve chamber 43, as supplied from the main reservoir 5, flows to the brake cylinder through passage and pipe 56, and an emergency application of the brakes is effected.

It will here be noted that when the emergency piston chamber 34 is vented, fluid under pressure continues to flow from the main reservoir to the pipe 38 through the choke fitting 42, but since the discharge of fluid through the pipe 51 to the atmosphere is at a much faster rate than the rate of flow through the choke fitting, the pressure of fluid in the emergency piston chamber 34 will not be increased, and the piston 35 will remain in its emergency position so long as the emergency valve 15 and pilot valve 48 are maintained unseated.

When the operator wishes to move the pedal lever 2 from foot off position to normal running and release position, he forces it forward with his foot, causing the lever 22 to be rotated about its fulcrum pin 23 in a clockwise direction against the power of the spring 30.

With the pedal lever in its normal running and release position, the projection 24 on one end of the lever 22 will engage the stem 11 at the closed end of the slot 25, but will exert no pressure thereon, and the emergency valve stem and cap 20 are relieved of the pressure of the other end of the lever 22, so that the pressure of spring 17 maintains the emergency valve 15 seated, thus closing communication from the emergency piston chamber 34 to the pilot valve chamber 45. With the emergency valve seated, the operator may permit the controller pedal lever 7 to move to foot off position without effecting an application of the brakes upon the unseating of the pilot valve 48.

In normally effecting an application of the brakes, the operator increases his foot pressure on the brake controlling pedal lever, causing it to move forwardly from its running and release position to any desired application position. As the pedal lever is thus actuated, the lever 22 is caused to rotate about its fulcrum pin 23 in a clockwise direction against the power of the spring 30 and through the medium of the projection 24, causing the stem 11 and plunger 10 to be moved inwardly, compressing the spring 9. The pressure of the spring, when thus compressed, causes the piston 8 to move inwardly, seating the release valve 13 and unseating the supply valve 12. With the supply valve unseated, fluid under pressure is supplied from the pipe 38 to the brake cylinder by way of the supply valve chamber 37 of the brake valve device, past the unseated supply valve 12, through piston chamber 55, straight air passages and pipe 58, cavity 57 in the emergency slide valve 44 and passage and pipe 56. Now when the brake cylinder pressure present in the piston chamber 55, together with the pressure of the spring 59 is sufficient to overcome the pressure of the spring 9, the piston 8 will be caused to move toward the left hand, permitting the pressure of the spring 14 to seat the supply valve 12 and thus close off the further flow of fluid to the brake cylinder. When the valve 12 is seated, the movement of the piston ceases, so that the release valve will remain seated, thus maintaining the brake cylinder pressure. By increasing the pressure on the pedal lever 2, the brake cylinder pressure will be increased.

It will here be noted that in effecting an application of the brakes by the use of the pedal lever 2, the flow of fluid past the unseated suply valve 12 will not be at a faster rate than fluid is supplied from the main reservoir through the choke fitting 42, so that the pressure of fluid in the emergency piston chamber 34 will be maintained, and the emergency piston 35 and slide valve 44 will remain in their extreme right hand position.

To release the brakes, the operator permits the pedal lever 2 to move to its running and release position, thus relieving the piston 8 of the brake valve device of the pressure of the spring 9, so that the pressure of the spring 59, together with the pressure of fluid in the piston chamber 55 causes the piston 8 to move to its extreme left hand position, unseating the release valve 13. Fluid under pressure from the brake cylinder now flows to the atmosphere past the unseated valve 13.

To release an emergency application of the brakes, the operator moves the pedal lever to running and release position, in which the emergency valve 15 is seated. With the valve 15 seated, the pressure of fluid in the emergency piston chamber 34 will be increased, and when this pressure is substantially equal to the pressure of fluid in the emergency valve chamber 43, the pressure of the spring 36 will cause the piston 35 and slide valve 44 to move to their extreme right hand position. With the slide valve 44 in this position, fluid under pressure is released from the brake cylinder to the atmosphere by way of pipe and passage 56, cavity 57 in the emergency slide valve 44, straight air passage and pipe 38, piston chamber 55 in the brake valve device 1, past the unseated release valve 13, and passage 60.

From the foregoing description it will be seen that I have provided a fluid pressure brake equipment in which the brake valve device 1 and the car motor controller actuating mechanism are so interlocked that an automatic emergency application of the brakes will be effected in the event of the incapacitation of the operator, and that the operator does not have to maintain foot pressure on the brake controlling pedal lever and the controller pedal lever 7 at the same time to prevent an emergency application of the brakes.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a valve device operated upon a reduction in fluid pressure for effecting an emergency application of the brakes, of a brake controlling pedal lever, means operated upon the release of said brake controlling pedal lever for establishing communication through which fluid is adapted to flow from said valve device, a controller pedal lever, and means operated upon the release of said controller pedal lever for establishing communication through which fluid flowing through the first mentioned communication is vented.

2. In a fluid pressure brake, the combination with a valve device operated upon a reduction in fluid pressure for effecting an emergency application of the brakes, of a brake controlling pedal lever, a controller pedal lever, and two valves operative to establish communication through which fluid under pressure is vented from said valve device, one of said valves being operated upon the release of the brake controlling pedal lever and the other being operated upon the release of the controller pedal lever.

3. In a fluid pressure brake, the combination with a sand pipe, of a valve device operated upon a reduction in fluid pressure for effecting an emergency application of the brakes, a brake controlling pedal lever, a controller pedal lever, a valve operated upon the release of the brake controlling pedal lever for establishing communication through which fluid under pressure is released from said valve device, and a valve operated upon the release of the controller pedal lever for establishing communication through which fluid under pressure released from said valve device through the first mentioned communication is vented to said sand pipe.

4. In a fluid pressure brake, the combination with a sand pipe, of a valve device operated upon a reduction in fluid pressure for effecting an emergency application of the brakes, a brake controlling pedal lever, a controller pedal lever, a valve operated upon the release of the brake controlling pedal lever for establishing communication through which fluid under pressure is released from said valve device, and a valve operated upon the release of the controller pedal lever for establishing communication through which fluid under pressure released from said valve device through the first mentioned communication is vented to said sand pipe, either one of said valves when its respective pedal lever is depressed preventing the venting of fluid under pressure from said valve device.

5. In a fluid pressure brake, the combination with a valve device operated upon a reduction in fluid pressure for effecting an emergency application of the brakes, of a brake controlling pedal lever, a brake valve device controlled by said lever for normally effecting the application and release of the brakes and operated upon the release of said pedal lever for establishing communication through which fluid under pressure is adapted to be released from said valve device, a controller pedal lever having a power on position and a power off position, and a valve preventing the flow of fluid under pressure from said valve device when said communication is established by said brake valve device and the controller pedal is in power on position, said valve being operated to vent fluid under pressure from said valve device when the controller pedal is in power off position and said communication is established.

6. In a fluid pressure brake, the combination with an emergency brake pipe and means operated upon a reduction in pressure in said pipe for effecting an emergency application of the brakes, of a pipe through which fluid under pressure is supplied to effect the sanding of the rails, a brake controlling pedal lever, a controller pedal lever, and two valves operated upon the release of both of said pedal levers for venting fluid under pressure from the emergency brake pipe to the sanding pipe.

7. In a fluid pressure brake, the combination with an emergency brake pipe and means operated upon a reduction in pressure in said pipe for effecting an emergency application of the brakes, of a pipe through which fluid under pressure is supplied to effect the sanding of the rails, a brake controlling pedal lever, a controller pedal lever, and two valves operated upon the release of both of said pedal levers for venting fluid under pressure from the emergency brake pipe to the sanding pipe, either one of said valves preventing the venting of fluid under pressure from the emergency brake pipe when its respective pedal lever is depressed.

In testimony whereof I have hereunto set my hand, this 23rd day of May, 1930.

JOSEPH C. McCUNE.